United States Patent Office 3,600,477
Patented Aug. 17, 1971

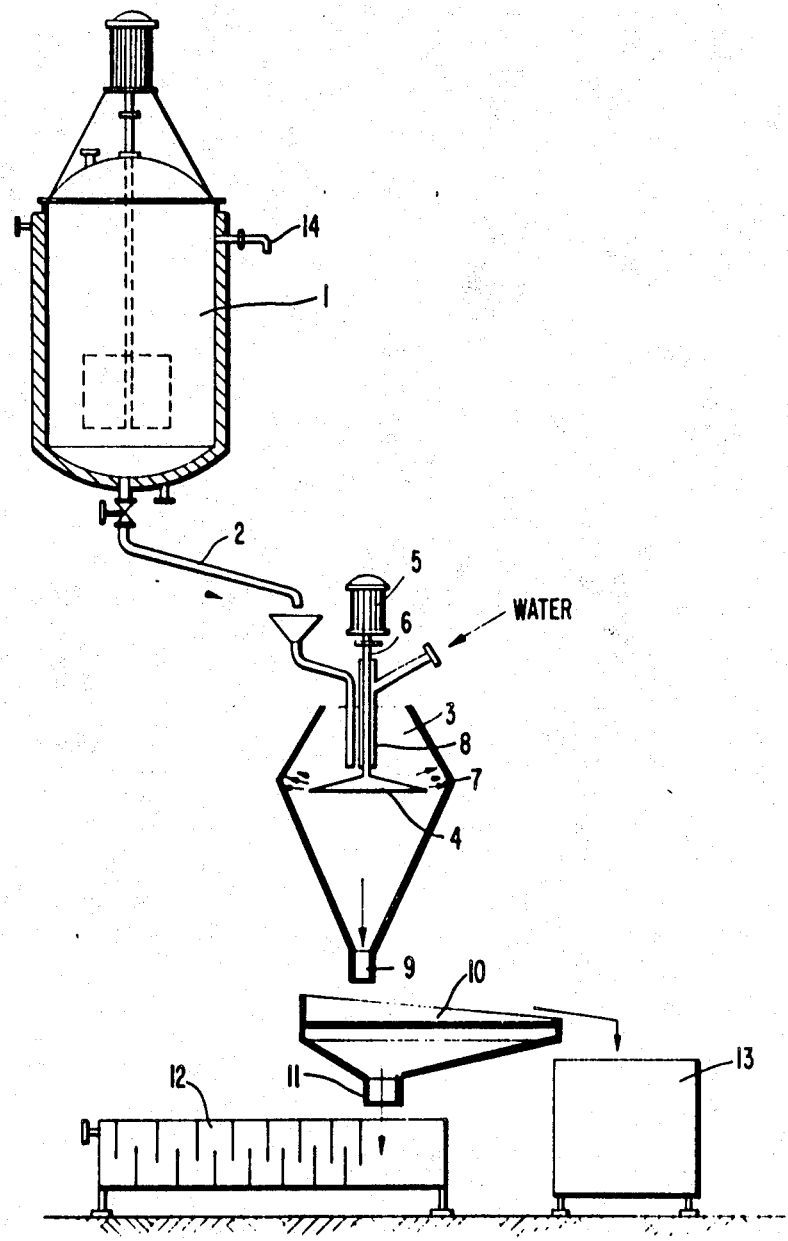

3,600,477
PROCESS FOR GRANULATING EXPLOSIVE COMPOSITIONS
Lutz Friedel, Steyerberg, Gerhard Lindner, Holtorf, and Bruno Rohe, Steyerberg, Germany, assignors to Dynamit Nobel Aktiengesellschaft, Troisdorf, Germany
Filed Dec. 24, 1968, Ser. No. 786,678
Claims priority, application Germany, Jan. 16, 1968, P 16 67 011.4
Int. Cl. C06b 21/02
U.S. Cl. 264—3
10 Claims

ABSTRACT OF THE DISCLOSURE

The present disclosure relates to a process and apparatus for the granulation of materials, for example suspensions of explosives, wherein said materials are introduced into a granulating vessel onto the surface of a rotating disk which flings the materials against the walls of said granulating vessel. Advantageously, water or another suitable liquid is also introduced onto the surface of the rotating disk and is likewise flung against the wall of the granulating vessel together with the materials to be granulated. The addition of a fluid such as water during the process provides a maximum degree of safety during the operation.

BACKGROUND OF THE INVENTION

The present invention relates a process for the continuous production of granulated materials, preferably from an explosive, for example from suspensions of explosives, such as a mixture of trinitrotoluene with hexogen (cyclotrimethylenetrinitramine).

For the granulation of explosives, various methods are well known, for example the rolling method, by means of which the conventional "sheet TNT" is obtained. Among the disadvantages of the conventional granulating processes is the fact that they are unsuitable for explosive suspensions, that is, mixtures of liquid explosives and solid explosives, since there is the danger in connection with these mixtures that as soon as they are not kept in motion, the solid portion, for example hexogen (cyclotrimethylenetrinitramine), octogen (cyclotetramethylenetetramine), or the like, settles to the bottom, and thus a granulated material is obtained which is not uniform in its composition.

SUMMARY OF THE INVENTION

An object of the present invention is to avoid the prior art disadvantages in the granulation of materials, particularly suspensions of explosives.

Another object of the present invention is to provide an improved process and apparatus for the granulation of a mixture of materials wherein a uniform granulated product can be obtained.

A further object of the present invention is to provide an improved process and apparatus for granulating suspensions of explosives which is a continuous process and thus an economical procedure which affords a maximum degree of safety.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved process and apparatus for the granulation of materials, particularly suspensions of explosives may be obtained by introducing the material to be granulated together with a liquid spray onto the surface of a rotating element which flings the mixture of said material and liquid against the walls of the granulating vessel thereby rapidly atomizing said mixture by the centrifugal effect which is produced. Advantageously, the process and apparatus of the present invention is directed to the granulation of suspensions of explosives, such as for example a suspension composed of a solid component and another component which is capable of being liquefied. According to the present invention the solid components of the explosive suspension do not separate from the liquid components. Furthermore, the present process is a contiuous one and thus is an econominal procedure which affords a maximum degree of safety since the granulating step is conducted in the presence of a liquid such as water. By appropriately adjusting the granulating media and the respective amounts of constituents with respect to each other, as well as by controlling the speed of rotation of the centrifugal disk, a granulated material of any desired consistency, dimension, and the like can be obtained, depending on the purpose for which it is intended to be employed. The expression, "to granulate" means the formation of a substance into grains, granules or small masses.

In accordance with a further embodiment of the present invention, and particularly in connection with suspensions of explosives, it is frequently desirable to use an explosive moistened with water as the solid components, such as for example cyclotrimethylenetrinitramine or cyclotetramethylenetetramine moistened with water. The presence of water with the explosive improves the safety aspect of the process.

According to the present invention, the present process can be advantageously conducted by utilizing a granulating vessel having the shape of a double cone, with a centrifugal disk disposed axially in the vessel in the zone of the largest diameter of said vessel. The centrifugal disk, which is of conical shape on its upper surface, is driven by a motor which is dosposed on the outside of the granulating vessel. The granulating vessel is also provided with a liquid feed line or conduit which terminates in the vicinity of the centrifugal disk, for example above said disk. The granulating vessel is also provided with another conduit means for introducing the material to be granulated in the vicinity of the centrifugal disk. Advantageously, said conduit means is arranged directly beside the liquid conduit means and terminates preferably at the same level as said liquid conduit means above the centrifugal disk.

BRIEF DESCRIPTION OF THE DRAWING

The present invention will become more fully understood from the detailed description given hereinbelow and the accompanying drawing which is given by way of illustration only and thus is not limitative of the present invention and wherein, The figure shows a series arrangement of the apparatus used for granulating suspensions of explosives.

DESCRIPTION OF THE PREFERRED EMBODIMENTS

Referring now to the drawing, the liquid explosive, for example trinitrotoluene is melted with hot water in a double-walled melting vessel 1 provided with an aggitating unit and a water overflow 14. The solid component, for example cyclotrimethylenetrinitramine or cyclotetramethylenetetramine is added to the liquid trinitrotoluene and does not melt because of its higher melting point. The homogeneous suspension is removed from the melting vessel through the drain outlet 2 and introduced into the granulating vessel 3 made of aluminum, rustproof steel, or the like. The granulating vessel advantageously has the shape of a double cone. A centrifugal disk 4 is disposed in the granulating vessel 3, said disk being actuated, that is set into rotation, by a motor 5 provided with a shaft 6. Around the shaft 6 of the drive unit or motor 5, a pipe 8 is provided. Water or another suitable liquid, or a fluid, including a gas such as for example, air, is constantly supplied to the centrifugal disk 4 and is flung by said disk against the walls 7 of the granulating vessel 3. As soon as the suspension of explosives also impinges on the centrifugal disk 4 through outlet 2 terminating in the granulating vessel 3, this suspension is likewise flung against the walls 7 of the granulating vessel together with the water. During this process, the suspension of explosives is granulated in such a manner that a thin film of the liquid components of the suspension adheres around the solid components. The granulated substance together with the water is then conveyed through outlet 9 onto the suction filter 10. The water flows off via the outlet 11 of the suction filter 10, is cleaned in the filter trough 12, and is then recycled into the granulating process whereas the granulated material is continuously conveyed from the suction filter 10 into the container 13 where it is further treated in a conventional manner. If desired, a screen can be used in place of the suction filter.

The invention being thus described, it will be obvious that the same may be varied in many ways. Such variations are not to be regarded as a departure from the spirit and scope of the invention, and all such modifications as would be apparent to one skilled in the art are intended to be included.

What is claimed is:

1. A continuous process for the granulation of explosive compositions which comprises introducing the materials to be granulated into a fluid stream in a granulating vessel and atomizing the mixture through centrifugal effect by impinging said mixture onto the surface of a rotating disk which flings the mixture against the walls of said granulating vessel, and separating the fluid from the granulated product to recover said product.

2. The process of claim 1, wherein the explosive compositions to be granulated are a suspension of explosives containing a liquid phase and a solid phase.

3. The process of claim 1, wherein the explosive compositions are moistened with water prior to being introduced into the fluid stream.

4. The process of claim 1, wherein the fluid stream is selected from the group consisting of water and air.

5. The process of claim 1, wherein the separated fluid is filtered and recycled to the granulating vessel.

6. A continuous process for the granulation of a suspension of explosives having a liquid phase and a solid phase which comprises adding a mixture of two explosives to a melting vessel, heating said mixture to melt one of said explosives into a liquid phase, the other explosive forming the solid phase because of its higher melting point, introducing said suspension into a liquid stream in a granulating vessel and atomizing the mixture through centrifugal effect by impinging said mixture onto the surface of a rotating disk which flings the mixture against the walls of said granulating vessel, thereby granulating said suspension in such a manner that a thin film of the liquid phase of the suspension adheres to the solid phase, and separating the liquid from the granulated product to recover said product.

7. The process of claim 6, wherein the solid phase is selected from the group consisting of cyclotrimethylenetrinitramine and cyclotetramethylenetetramine.

8. The process of claim 6, wherein the liquid phase is trinitrotoluene.

9. The process of claim 6, wherein the liquid is water.

10. The process of claim 1, wherein the explosive composition to be granulated and the fluid stream are simultaneously charged into the granulating vessel in a side by side manner.

References Cited
UNITED STATES PATENTS

| | | | |
|---|---|---|---|
| 2,346,116 | 4/1944 | Snelling | 264—3UX |
| 3,173,817 | 3/1965 | Wright | 264—3X |

BENJAMIN R. PADGETT, Primary Examiner

S. J. LECHERT, Jr., Assistant Examiner

U.S. Cl. X.R.

149—92, 105; 241—5, 15, 18, 21